(12) United States Patent
Nagaishi

(10) Patent No.: US 6,219,449 B1
(45) Date of Patent: Apr. 17, 2001

(54) CHARACTER RECOGNITION SYSTEM

(75) Inventor: Michihiro Nagaishi, Kyoto (JP)

(73) Assignees: ATR Auditory; Visual Perception Research Laboratories, both of Kyoto (JP)

( * ) Notice: Subject to any disclaimer, the term of this patent is extended or adjusted under 35 U.S.C. 154(b) by 0 days.

(21) Appl. No.: 08/665,974

(22) Filed: Jun. 21, 1996

Related U.S. Application Data

(63) Continuation of application No. 08/228,311, filed on Mar. 22, 1993, now abandoned.

(30) Foreign Application Priority Data

Oct. 19, 1992 (JP) .................................................. 4-279922

(51) Int. Cl.[7] .................................................. G06K 9/72
(52) U.S. Cl. .......................................... 382/186; 382/229
(58) Field of Search .................................. 382/185, 186, 382/228, 229, 230, 231, 309, 310, 160, 161, 187–189

(56) References Cited

U.S. PATENT DOCUMENTS

| | | | |
|---|---|---|---|
| 4,731,857 | * 3/1988 | Tappert et al. | 382/187 |
| 4,979,227 | * 12/1990 | Mittelbach et al. | 382/231 |
| 4,989,258 | * 1/1991 | Takahashi et al. | 382/199 |
| 5,018,217 | * 5/1991 | Yoshida et al. | 382/266 |
| 5,075,896 | * 12/1991 | Wilcox et al. | 382/225 |
| 5,151,950 | * 9/1992 | Hullender | 382/187 |
| 5,159,644 | * 10/1992 | Martin et al. | 382/161 |
| 5,261,009 | * 11/1993 | Bokser | 382/230 |
| 5,465,309 | * 11/1995 | Johnson | 382/229 |

FOREIGN PATENT DOCUMENTS 59-95682   6/1984   (JP) .

OTHER PUBLICATIONS

"Contextual Word Recognition Using Probabilistic Relaxation Labeling", by A. Goshtasby et al., *Pattern Recognition*, vol. 21, No. 5, pp. 455–462, 1988.

"A Simplified Heuristic Version of a Recursive Bayes Algorithm for Using Context in Text Recognition", by R. Shinghal et al., IEEE Transactions on Systems, Man, and Cybernetics, vol. SMC–8, No. 5, pp. 412–414, May 1978.

Seong–Whan Lee et al., "Efficient Postprocessing Algorithms for Error Correction in Handwritten Hangul Address and Human Name Recognition",, Department of Computer Science, Chungbuk National University, IEEE 1993, pp. 232–235.

Katsumi Marukawa et al., A Post–Processing Method for Handwritten Kanji Name Recognition Using Furigana Information, Proceedings of the Second International Conference on Document Analysis and Recognition, IEEE Computer Society Press, Oct. 20–22, 1993, pp. 218–221.

Tsukumo, Jun "Handprinted Kanji Character Recognition Based on Flexible Template Matching" Pattern Rec. 1992 11thu th Int'l, vol. II, Conf. B.*

Sinha et al. "Visual Text Recognition through Contextual Processing" in Pattern Recognition vol. 21, No. 5 pp. 463–479, 1988.*

* cited by examiner

*Primary Examiner*—Jon Chang
(74) *Attorney, Agent, or Firm*—McDermott, Will & Emery

(57) ABSTRACT

Characters are input to input means to be turned to electronic data, character variation of each input character is expected based on the position of the character in a word when the character is hand-written, based on information necessary for determining priority of recognition results stored in storing means, priority of the recognition results based on the expected character variation is determined by priority processing means, the character is recognized by recognizing means based on the priority, and the result is output to output means.

7 Claims, 6 Drawing Sheets

CHARACTER RECOGNITION SYSTEM

This application is a continuation of application Ser. No. 08/228,311 filed Mar. 22, 1993 now abandoned.

BACKGROUND OF THE INVENTION

1. Field of the Invention

The present invention relates to a character recognition system. More specifically, the present invention relates to a character recognition system receiving hand written characters as inputs, recognizing the character data thereof and outputting the result of recognition.

2. Description of the Background Art

FIG. 10 is a schematic block diagram of a conventional character recognition system. Referring to FIG. 10, input means 1 receives a hand written character as an input and turns it into electronic data. The input character data is applied to recognizing means 2. Recognizing means 2 has necessary information for recognition, and recognizes the character data supplied from input means 1. Results and states of input means 1 and recognizing means 2 are applied to output means 3 which display necessary information.

When hand written characters are to be recognized by the conventional character recognition system shown in FIG. 10, it is difficult to obtain high ratio of recognition, since hand written characters generally have much variations and omissions. Accordingly, in the conventional character recognition system, the method of recognition itself has been improved by developing a dictionary for recognition of characters which are likely to have recognition errors. In order to attain higher ratio of recognition, it is necessary to correct the result of recognition by using means other than those providing such result of recognition.

One representative method is correction of the obtained result of recognition by confirming grammatical meaning by using grammatical knowledge. In this method, correct word sets are identified by using grammatical knowledge based on a dictionary related to grammar. More specifically, a plurality of candidates for characters obtained as a result of recognition are combined appropriately and a combination of characters having proper grammatical meaning is found as a unit of an idiom or a phrase.

However, a large number of character combinations must be studied by using enormous knowledge related to grammar in order to obtain a combination having proper grammatical meaning. Meanwhile, the obtained candidates for characters are treated as equally weighted. Especially when hand written characters are recognized, the result of recognition is not very reliable. Therefore, even if first candidates for characters are given as a result of recognition, actually the reliability of recognition may possibly vary widely character by character. Accordingly, if the plurality of candidates for characters obtained as a result of recognition are simply combined one after another, a large number of combinations must be generated, taking a long period of time, in order to obtain a combination having a proper grammatical meaning.

SUMMARY OF THE INVENTION

Therefore, an object of the present invention is to provide a character recognition system capable of obtaining a combination of candidates for characters efficiently by generating a smaller number of combinations.

Briefly stated, in the present invention, input means receives hand written characters as inputs and turn them into electronic data; when thus generated data of characters are provided, variations of the input characters are expected based on the position of the data of the characters; and character recognition is carried out with the recognition results being ranked with priority based on the expected variations of the characters.

Therefore, according to the present invention, combinations of words are generated based on the reliability of the recognition results taking into consideration the expected reliability of variation, and grammatical meaning is confirmed. Therefore, the number of words to be examined and the necessary time for examination can be reduced.

In a more preferred embodiment of the present invention, information for determining priority of the recognition results is stored, and priority of each character is determined based on the stored information, dependent on the position of the input data of characters.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Prior to the description of the embodiments, the principle of the present invention will be described.

Figure 6:
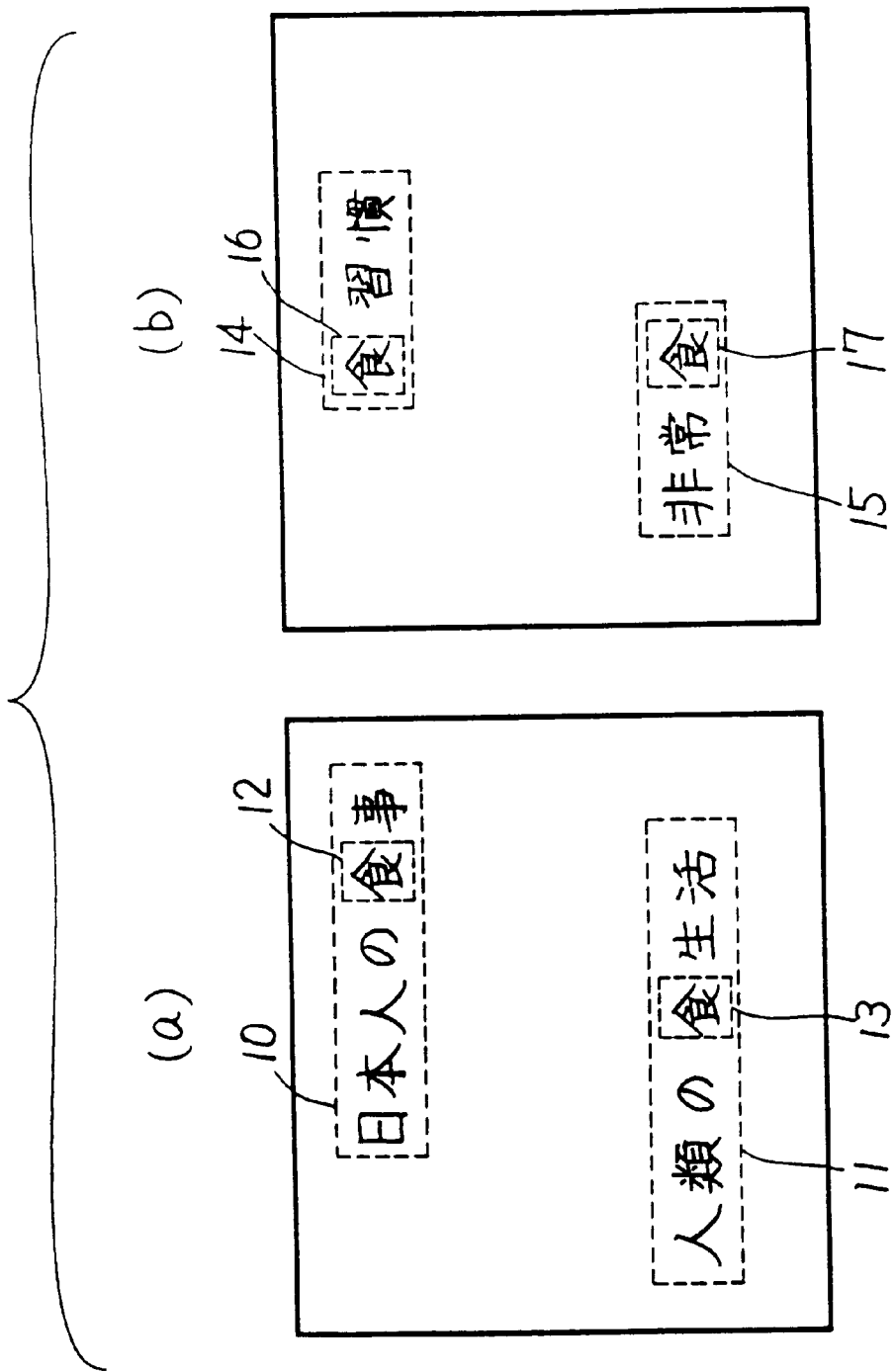
FIGS. 6(a)–(b) illustrate positions of a character in words.
Figure 7:
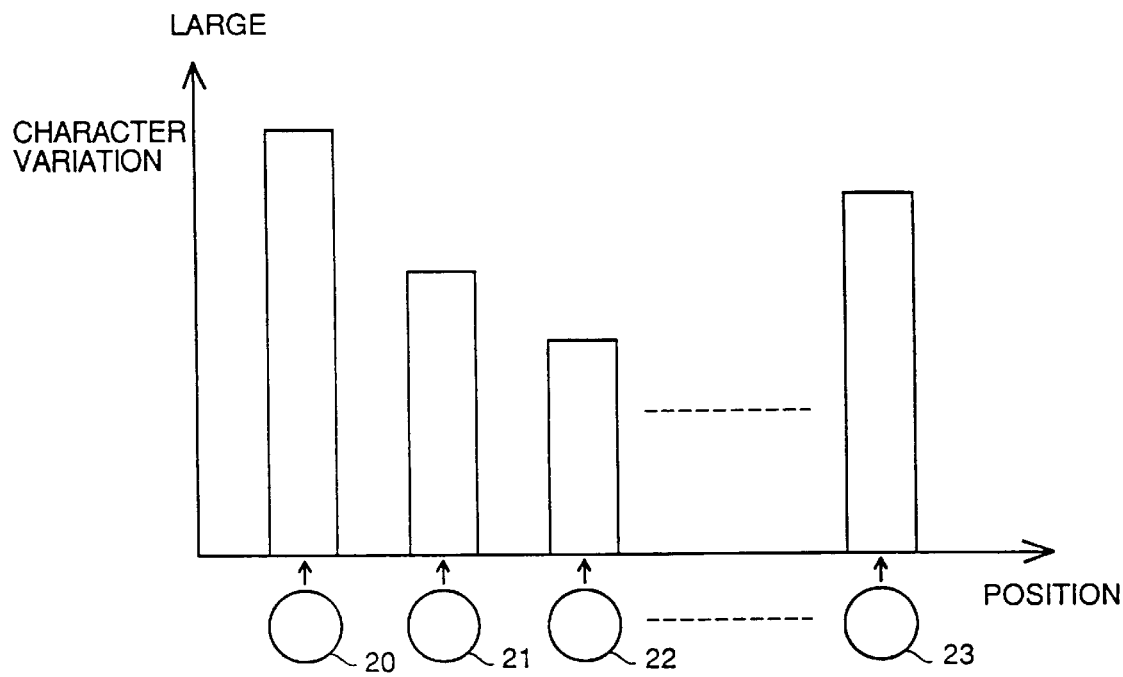
FIG. 7 is a graph showing variety of each character in a set of characters.

FIG. 6 shows positions of a character in words and FIG. 7 is a graph showing variations of each character in a set of characters.

First, relation between the character position in a document and magnitude of variation will be described. The character position means whether the character is at the middle of a word, at the beginning of a word or at the end of a word. FIG. 6(a) shows examples of a character in the middle of a word. The character 12 in a word 10 and a character 13 in the word 11, that is "❀" can be said to be at the middle of a word, since there are characters on both sides of the character "❀".

FIG. 6(b) shows examples of characters at the beginning and at the end of words. A character 16 in a word 14 is said at the beginning of a word as there are other characters only on the right side of the character. The character 17 in the word 15 is said to be at the end of a word as other characters exist only on the left side of the character.

The term "word" used here includes all semantic units and it refers not only to the general word but also paragraphs, sentences, phrases, clauses, and idioms. When the position of a character in a document is considered, the "word" is used as a reference.

Variation of each of the characters in a set of characters will be described with reference to FIG. 7.

There is a relation between the character position in the word and the variation of the character, that is, characters at the beginning and at the end of the word have larger variation, while the character at the middle of the word have smaller variation. Therefore, a data base as to how large character variation is generated dependent on the character position in the word can be prepared by collecting a number of hand written samples and statistically analyzing the tendency thereof. Now it is possible to expect variation of each character in a set of characters including arbitrary characters 20 to 23 based on the character position of each character by using the data base thus obtained, as shown in the graph of FIG. 7. In the example of FIG. 7, the variation of the character 20 at the beginning of the word and the variation of the character at the end of the word are larger than the variations of characters 21 and 22 at the middle of the word.

Generally, the ratio of recognition of a character with small variation is high. Therefore, if the recognition result of characters having smaller expected variation are weighted much and the recognition results of characters having larger expected variation are weighted less in identifying correct word sets by using knowledge, correct identification can be easily done in examining the grammatical meaning of the word.

An embodiment of the character recognition system of the present invention will be described.

Figure 1:
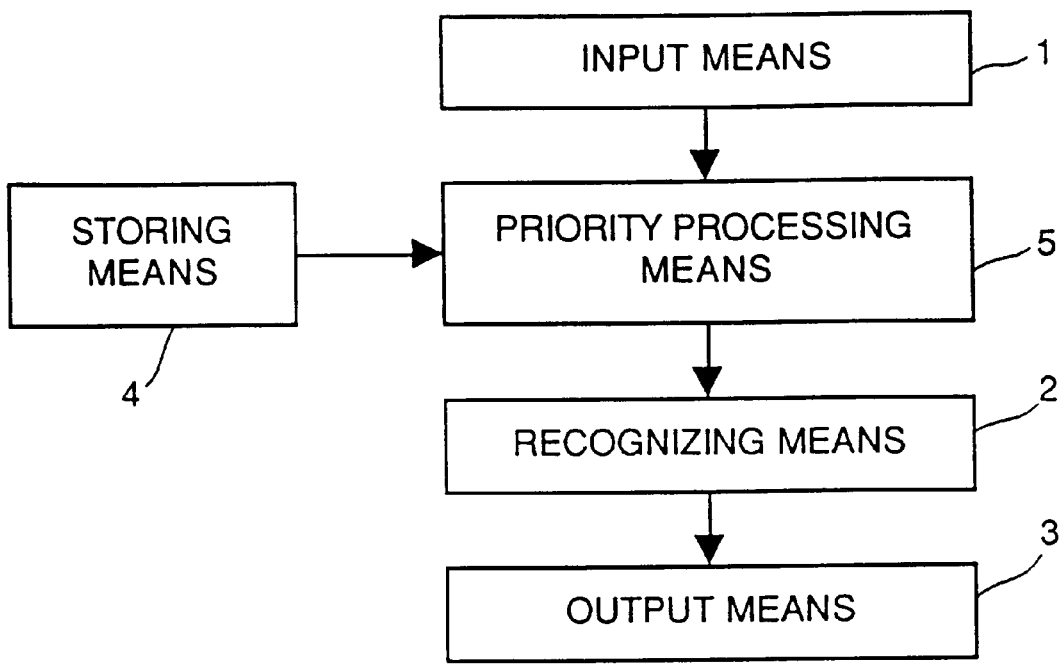
FIG. 1 is a schematic block diagram of one embodiment of the present invention.
Figure 10:
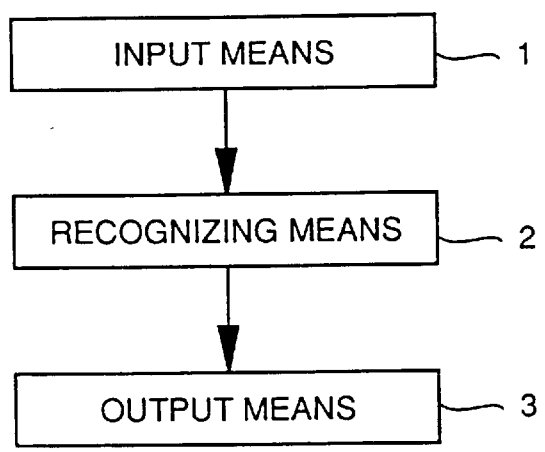
FIG. 10 is a schematic block diagram of a conventional character recognition system.

FIG. 1 is a schematic block diagram of one embodiment of the present invention. In the character recognition system shown in FIG. 1, priority processing means 5 is connected between input means 1 and recognizing means 2 shown in FIG. 10 and storing means 4 connected to priority processing means 5. Priority processing means 5 expects variation of an input character based on the position of the character in the word when the character provided as input to the input means 1 is hand-written, and determines priority of the recognition result based on the magnitude of the expected character variation. Information necessary for determining priority of the recognition result by the priority processing means 5 is stored in the storing means 4.

Figure 2:
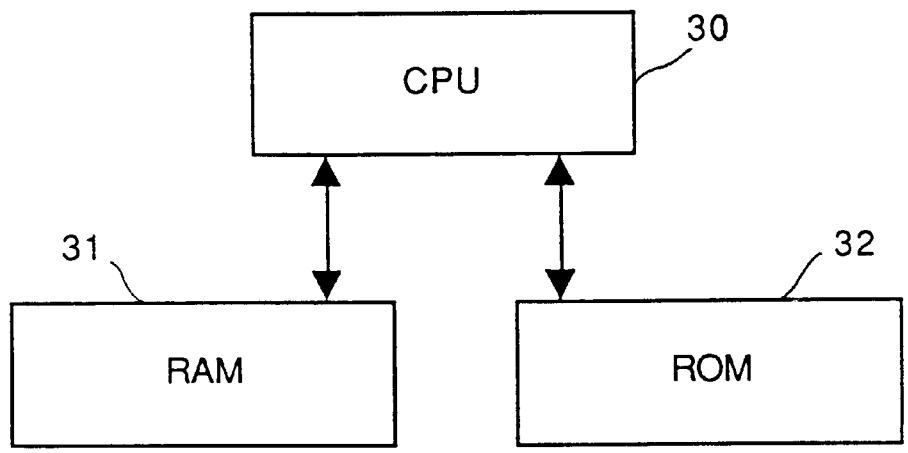
FIG. 2 is an electric circuit diagram of the character recognition system of the present invention.

FIG. 2 generally shows an electrical structure of one embodiment of the present invention. Referring to FIG. 2, a CPU 30 executes recognition processing by the priority processing means 5 and the recognizing means 2 shown in FIG. 1. Character data to be recognized and data obtained in the process of recognition are temporarily stored in a RAM 31, and data base necessary for recognition and so on are stored in a ROM 32.

Figure 3:
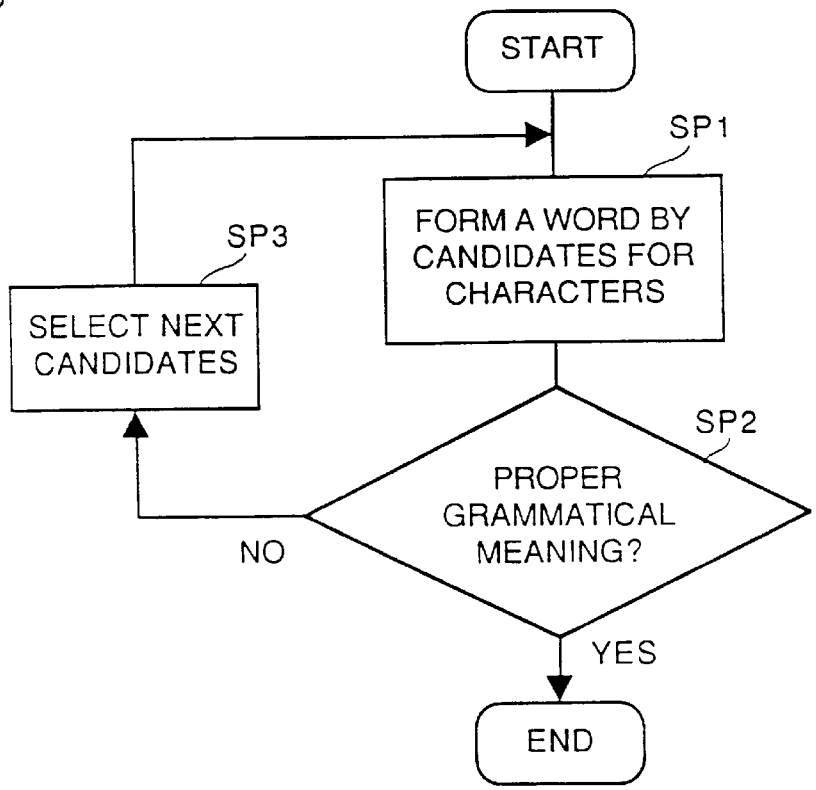
FIG. 3 is a flow chart showing an operation for obtaining a combination of candidates for characters having grammatically correct meaning in the character recognition system in accordance with one embodiment of the present invention.

FIG. 3 is a flow chart showing the operation of one embodiment of the present invention.

A specific operation of one embodiment of the present invention will be described with reference to FIGS. 1 to 3. When hand written characters are provided from input means 1, CPU 30 forms a word by a plurality of candidates for characters obtained as a result of recognition in step SP1 (in the figures, simply denoted by SP). In step SP2, CPU 30 confirms grammatical meaning of the thus formed word by referring to the data base with respect to examination of grammatical meaning in ROM 32. If the word has appropriate meaning, the process is terminated. If not, different candidates for characters are newly selected in step SP3 to form a different word, and grammatical meaning is examined again. In this manner, examination of meaning is continuously carried out every time a word is formed by a plurality of candidates for characters until a proper combination is obtained.

Steps for forming a word by a plurality of candidates for characters obtained as a result of recognition will be described with reference to FIGS. 4 and 5.

Figure 4:
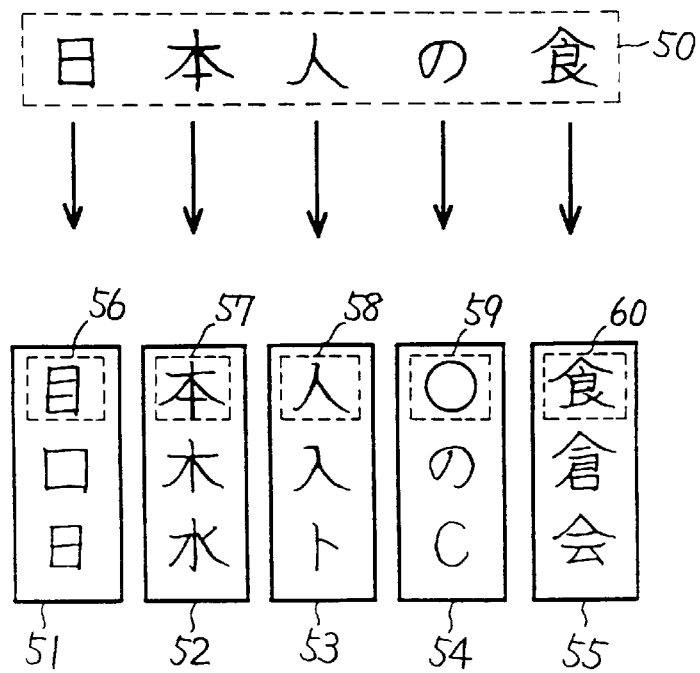
FIG. 4 shows input characters and an example of recognition results.

FIG. 4 shows an example of input characters and the recognition result thereof. Referring to FIG. 4, the input characters 50 includes "日", "本", "人", "の" and "食". For each of the input characters, first to three candidates are obtained which are ranked in accordance with the reliability of the recognition result. A group 51 of candidates is for the input character "日", a group 52 of candidates is for the input character "本", a group 53 of candidates is for the input character "人", a group 54 of candidates is for the input character "の" and a group 55 of candidates is for the input character "食", each group including first to third characters.

Now, when a word is formed by the first candidate of each of the groups 51 to 55, that is, the first candidate 56 "日" for the input character "日", the first candidate 57 "本" for the input character "本", the first candidate 58 "人" for the input character "人", the first candidate 55 "○" for the input character "の", and the first candidate 60 "食" for the input character "食", then the resulting word is "日本人○食", which does not have appropriate grammatical meaning. Therefore, it is necessary to form another word by using characters other than the first candidate in respective groups of candidates and to examine grammatical meaning thereof.

Figure 5:
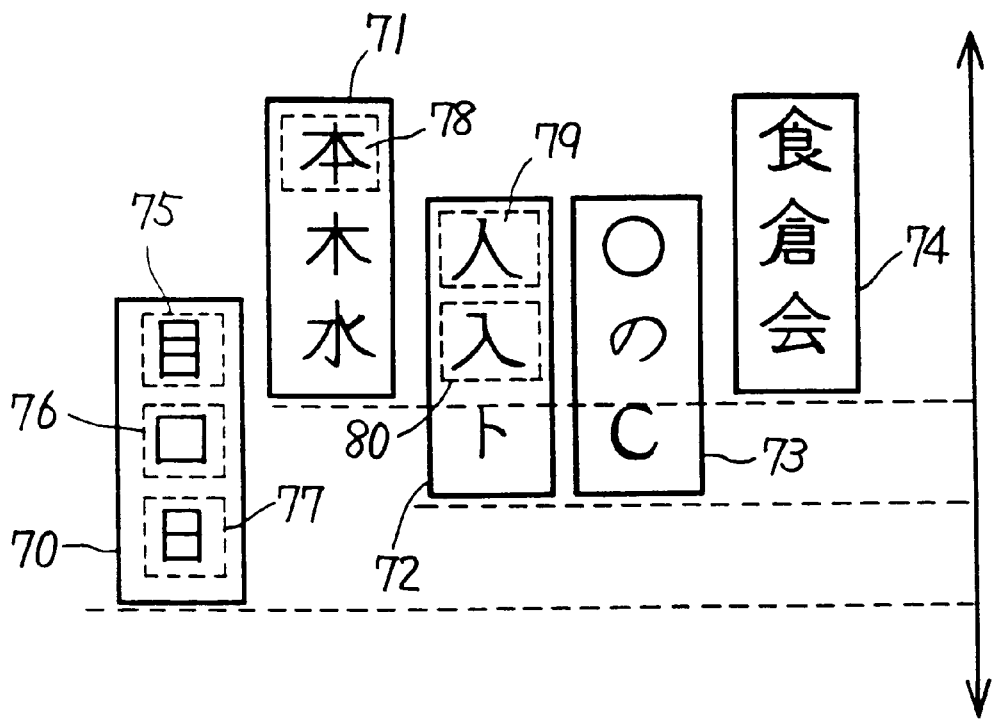
FIG. 5 shows candidates for characters weighted based on expected variations on the recognition results of FIG. 4.

FIG. 5 shows groups of candidates for characters weighted based on expected variation on the recognition results of FIG. 4. As for the variation of characters, a data base with respect to how character variation depends on character position in the document (for example, at the beginning of a word, at the end of a word or at the middle of the word) is stored in the ROM 32 in advance, and the magnitude of character variation is expected by determination with reference to the data. The groups 51 to 55 of candidates for characters are weighted or ranked based on the knowledge of variation of characters, and new groups 70 to 74 for candidates for characters are obtained. Referring to the groups 70 to 74 of candidates for characters shown in FIG. 5, the longitudinal direction with respect to the sheet represent the magnitude of the expected character variation. The expected variation becomes smaller upward and becomes larger downward. For example, the weighted group 70 of candidates for the input character "日" is relatively large as the input character "日" is at the beginning of the word. The variation of weighted groups 71, 72 and 73 of candidates for input characters "本", "人" and "の" respectively are smaller as these characters are at the middle of the word.

The steps for forming a word by the weighted groups 70 to 74 of candidates for characters will be described. The obtained recognition results of a character with small expected variation is highly reliable, while the recognition result of a character with large variation expected is smaller. Therefore, when a word is to be formed by a plurality of candidates for characters, candidates for characters with smaller variation expected are given priority. An example when characters "日本人" are input will be described.

At first, the first candidate 78 "本" for the input character "本" the variation of which is expected to be the smallest, and the first candidate 79 "人" for the input character "人" of which variation is expected to be the second smallest are fixed. Then, the first candidate 75 "日", the second candidate 76 "ロ" and the third candidate 77 "日" for the input character "日" are successively combined to provide the following groups of characters, that is, "日本人", "ロ本人", and "日本人".

Then, the first candidate 78 "本" for the input character "本" and the second candidate 80 "人" for the input character "人" are fixed and the first candidate 75 "日", the second candidate "ロ" and the third candidate 77 "日" for the input character "日" are successively combined, and groups of characters "日本人", "ロ本人", and "日本人" are provided in the similar manner. More specifically, words are formed with candidates for characters the variation of which are expected to be small and thus the reliability of recognition results of which are high are fixed with priority, and the candidates for characters of which variation are expected to be large and the reliability of recognition results are lower are changed earlier. Every time a word is formed in accordance with such procedure, the grammatical meaning of the word is examined. Therefore, the possibility of a word having proper grammatical meaning being included in words obtained relatively earlier among a plurality of words obtained in the above described order becomes higher as compared with a case in which words are formed simply by combining at-random the candidates for characters. Thus, the number of words to be examined and the time necessary for examination can be reduced.

Figure 8:
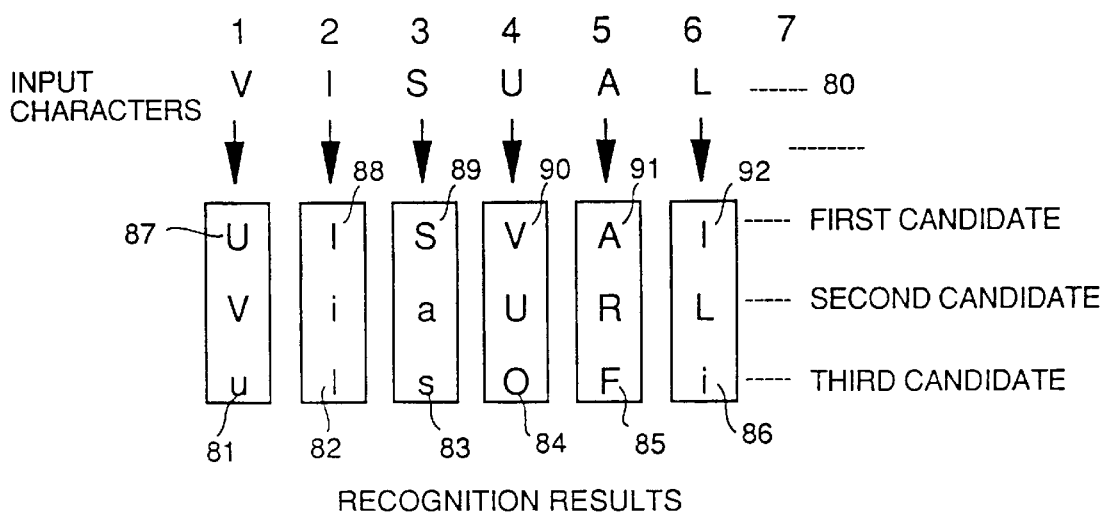
FIG. 8 shows an example of the present invention applied to a character recognition system for recognizing alphabets.
Figure 9:
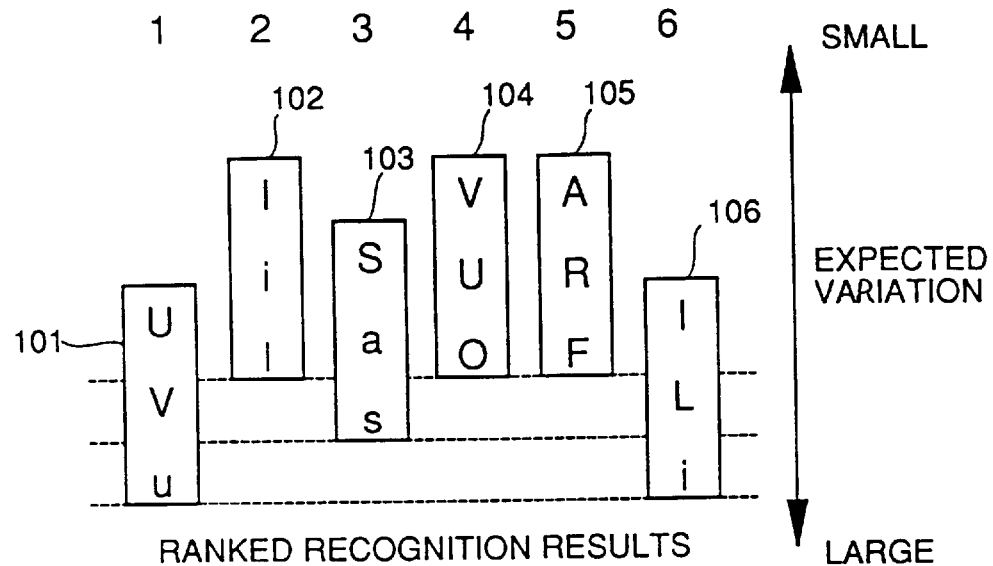
FIG. 9 shows candidates for characters weighted based on the expected variation with respect to the recognition results of FIG. 8.

FIGS. 8 and 9 show an embodiment of the present invention applied to a character recognition system for recognizing alphabets. Referring to FIG. 8, input characters 80 include "V", "I", "S", "U", "A" and "L", and first to third candidates are obtained for each of the input characters with the reliability of recognition results higher in this order. When a word is formed by the first candidates of respective groups for the input characters, that is, the first candidate 87 "U" for the input character "V", the first candidate 88 "I" for the input character "I", the first candidate 89 "S" for the input character "S", the first candidate 90 "V" for the input character "U", the first candidate 91 "A" for the input character "A" and the first candidate 92 "I" for the input character "L", the result will be "UISVAI", which does not have proper grammatical meaning. Therefore, it is necessary to form other words by using candidates other than the first candidates for respective characters and to examine grammatical meaning.

FIG. 9 shows the groups of candidates for characters weighted or ranked based on the expected variation. In this example of FIG. 9 also, the variation of character is expected with reference to the data base stored in the ROM 32, in the same manner as described with reference to FIG. 5. The groups 81 to 86 of candidates for characters are weighted dependent on the expected character variation, and new groups 101 to 106 of candidates for characters are obtained. Referring to the groups 101 to 106 of candidates shown In FIG. 9, the lengthwise direction with respect to the sheet represents magnitude of the expected character variation. In other words, the variation becomes smaller upward, and the variation becomes larger downward. As for the magnitude of the expected variation, the variation of the group 101 of the weighted candidates for the input character "U" is large as the input character "U" is at the beginning of the word. The variations of the groups 102 to 105 of the weighted candidates for input characters "I", "S", "V" and "A" respectively are smaller as these characters are at the middle of the word.

FIG. 9, the groups 101 to 106 of the recognition results are ranked in order of reliability based on the knowledge of variation in the documents. The second ("I"), fourth ("U") and fifth ("A") input characters have the smallest variation, while the first ("V") and sixth ("L") input characters have the largest. First, as a character with small variation is more reliable, the first candidates of the second (102), fourth (104)0 and fifth characters (105) are fixed, while all candidates of the first (101), third (103) and sixth (106) characters are changed. This gives "UISVAI", "VISVAL", "uISVAi", "UISVAL", "VISVAI" etc. Next, the first candidates of the second, fourth and fifth characters, and the second candidate of the third character are fixed, while all candidates of the first and sixth characters are changed. Then , the word sets "UIaVAI", "VIaVAL", "uIaVAi" etc. are made. The candidates with small variation are fixed in order of the number of candidates (first, second, . . . ), while other candidates are changed, and word sets are made. The meaning is checked as a word set changes until the correct word "VISUAL" is found. In this way, the probability of finding the correct word is higher than the probability of finding it using simple combinations.

As described above, according to the embodiment of the present invention, character variation is expected based on the character position in a sentence or word when the characters are hand-written, combinations of characters are formed based on the reliability of recognition results dependent on the magnitude of the expected character variation and grammatical meaning of these combinations are examined when a word having a proper grammatical meaning is to be found from a plurality of candidates for characters obtained as a result of recognition, and therefore the number of combinations to be examined and the time necessary for examination can be reduced.

In addition, since the reliability of recognition results can be expected, a proper word can be found from the actually existing combinations with high possibility by giving priority to the recognition results of characters with high reliability, even if there is no correct character included in the candidates for characters of the recognition results.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A character recognition system for recognizing handwritten characters, comprising:

input means receiving hand-written characters as inputs for turning them to electronic character data; and character recognizing means for expecting character variation of the input characters based on character position in the character data input from said input means, and for carrying out character recognition in accordance with priority of recognition results based on the expected magnitude of character variation.

2. The character recognition system according to claim 1, wherein
said character recognizing means includes
storing means for storing information for determining priority of said recognition results, and
priority determining means for determining priority of recognition results based on the information stored in said storing means in accordance with the character position in the character data input from said input means.

3. The character recognition system according to clam 2, wherein
said storing means includes means for storing information related to how character variation depends on a position of the character in a semantic unit which the character is located, and
said priority determining means includes means for determining, with priority, a character candidate, for which character variation is expected to be small, by reading from said storing means the information of character variation which corresponds to that character position.

4. The character recognition system according to claim 3, wherein
said character recognizing means includes means for determining whether or not the character candidate determined in accordance with the priority has correct meaning in the semantic unit based on grammatical knowledge.

5. An automated character recognition system for recognizing hand-written characters arranged in semantic units, comprising:

means for receiving the hand-written characters as inputs and converting the hand-written characters to electronic character data;
a random access memory for storing the electronic character data to be recognized;
a read only memory for storing information related to how character variation depends on a position of the character in a semantic unit which the character is located;
a central processing unit including
  i) a priority determining means for determining the priority of each character based on the information stored in the read only memory, and
  ii) means for performing character recognition based on the priority determined by the priority determining means and storing the recognized characters in the random access memory; and
means for displaying the recognized characters stored in the random access memory in a character unit.

6. The automated character recognition system according to claim 5, wherein said priority determining means includes means for determining, with priority, a character candidate, for which character variation is expected to be small, by reading from the read only memory the information of character variation which corresponds to that character position.

7. The automated character recognition system according to claim 6, wherein said central processing unit includes means for determining whether or not the character candidate determined in accordance with the priority has correct meaning in the semantic unit based on grammatical knowledge.

* * * * *